United States Patent [19]

Titley

[11] Patent Number: 4,709,878

[45] Date of Patent: Dec. 1, 1987

[54] FIN ASSEMBLY DEPLOYMENT SPRING

[75] Inventor: Mark C. Titley, Stevenage, United Kingdom

[73] Assignee: British Aerospace PLC, London, England

[21] Appl. No.: 850,166

[22] Filed: Apr. 10, 1986

[51] Int. Cl.[4] ............................................. F16F 1/00
[52] U.S. Cl. .................................. 244/328; 267/161; 267/182
[58] Field of Search ..................... 244/3.27, 3.28, 3.29; 267/182, 158, 161; 102/351, 357, 393; 135/40; 30/159

[56] References Cited

U.S. PATENT DOCUMENTS

| | | | |
|---|---|---|---|
| 3,347,492 | 10/1967 | Abramson | 244/3.28 |
| 3,690,595 | 9/1972 | Rusbach | 244/3.27 |
| 3,918,664 | 11/1975 | Grosswendt | 244/3.28 |
| 4,465,267 | 8/1984 | Chatelin | 267/161 |

FOREIGN PATENT DOCUMENTS 560770  6/1971  Switzerland ...................... 244/3.28

Primary Examiner—Deborah L. Kyle
Assistant Examiner—Michael J. Carone
Attorney, Agent, or Firm—Cushman, Darby & Cushman

[57] ABSTRACT

It is known to use springs to deploy steering fins on board projectiles, each fin having its own spring and a separate mechanism for latching it in its deployed position. Described herein is an integral spring/latching mechanism which is operable to deploy a plurality of fins and then to latch them in their deployed positions. The mechanism comprises a single piece of spring material which is formed such that a first portion engages with the projectile body and a plurality of second portions each exerting a spring force on respective fins to deploy the fin and to latch it in its deployed position, the second portions extending radially outward with respect to the first portion when deploying the fins.

4 Claims, 3 Drawing Figures

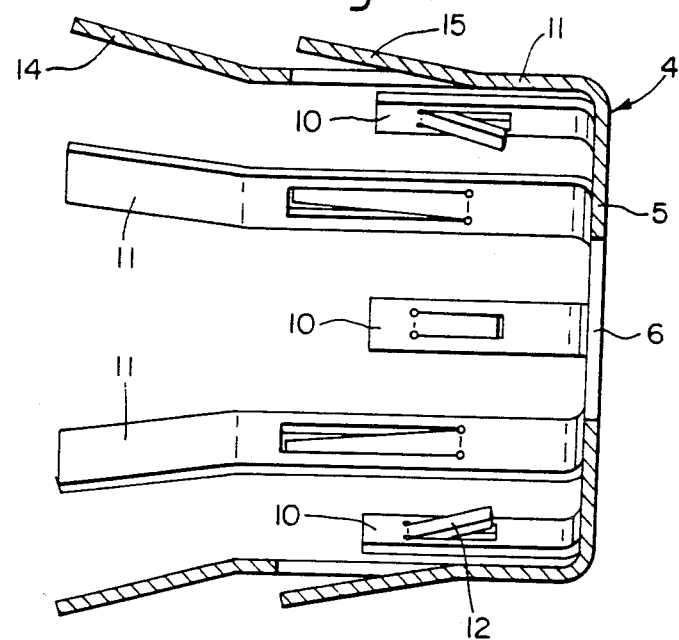
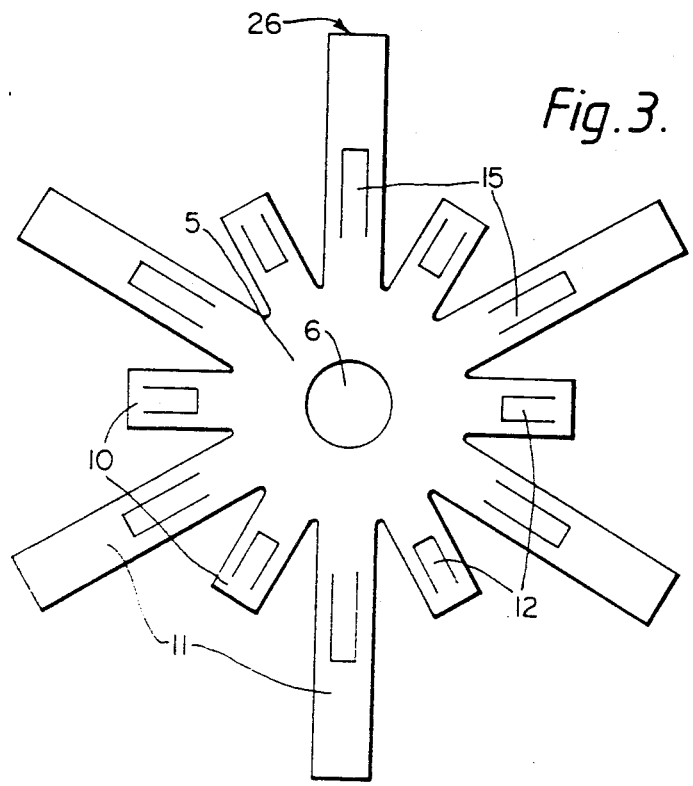

FIN ASSEMBLY DEPLOYMENT SPRING

This invention relates to springs and spring arrangements for deploying a plurality of movable members from respective first positions to respective second positions, for example, deploying the fins of a projectile from their respective stowed positions to their respective operative positions.

It is known to use springs to deploy the steering fins of a projectile. Normally, one or more spring members are used to deploy each fin and then a separate latching mechanism is used on each fin to latch the deployed fin into its operating position. Known methods of fin deployment tend to be costly in both materials (in the form of components) and assembly time as each fin-deployment system has to be assembled separately.

According to a first aspect of the invention, there is provided a fin deployment spring made from a single piece of spring material and comprising a first portion adapted for being engaged with a body from which a plurality of fins are to be deployed in radial directions, and a plurality of second positions each operable to exert a spring force in a respective direction radially outwards with respect to the first portion for deploying a respective one of said fins.

The spring may comprise a plurality of third positions operable for exerting spring force in respective radially inward directions upon said body while said first portion is engaged therewith.

According to a second aspect of the invention, there is provided an integral spring arrangement for mounting on a body which arrangement comprises a plurality of spring portions for erecting a plurality of members from respective stowed positions to respective operating positions with respect to said body and for latching said members into their respective operating positions, the spring arrangement further comprising spring portions operable for locking the arrangement into a predetermined position on said body.

For a better understanding of the invention, reference will now be made, by way of example, to the accompanying drawings in which:

FIG. 2 is a sectioned side elevation of the spring arrangement only; and

FIG. 3 is a plan view of a blank which may be used to form the FIG. 2 arrangement.

Figure 1:
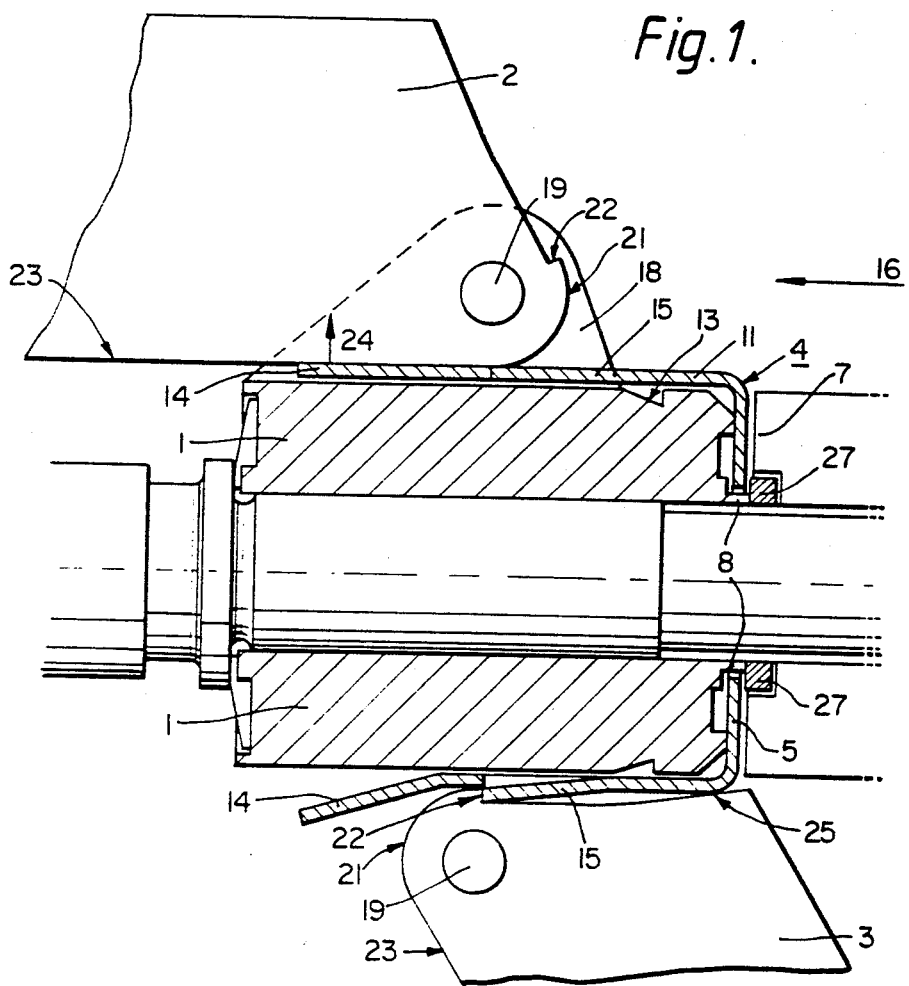
FIG. 1 is a sectional side elevation of a spring arrangement for deploying fins mounted on a projectile.

FIG. 1 shows part of a barrel-launched projectile which comprises a rotatable hub 1 carrying six flight control fins (only two of which, 2 and 3, can be seen). The control fins are equally-spaced around the hub 1 and each fin is pivotably connected to the hub 1 so that it can move from a stowed position aligned with the axis of the projectile, to an operative position. The fin 2 is shown in the stowed position while fin 3 is shown deployed. Deployment of the fins is effected by a spring arrangement 4 which is also shown in FIG. 2. The spring arrangement 4 comprises an annular portion 5 which defines a central hole 6, and which is positioned between one end of the hub 1 and an adjacent non-rotating part 7 of the projectile body, with the hole 6 engaged around a short reduced-diameter extension 8 of this end of the hub 1. From respective positions spaced around the periphery of the annular portion 5 of the spring arrangement 4, a series of twelve projecting arms extend alongside the hub 1 generally parallel to the projectile axis. Alternate ones of the arms, the arms 10, are shorter than the other arms 11, and are formed with respective radially inwardly extending barbs 12. These barbs 12 engage with an annular V-shaped groove 13 formed around the hub 1, when the spring arrangement 4 has been fitted over the hub 1. The longer arms 11 are aligned with respective ones of the fins. the end portion 14 and an intermediate tongue or flap portion 15 of each of the arms 11 are bent outwardly.

The spring arrangement 4 is positioned by being pushed onto the hub 1 in the direction of the arrow 16. As the arrangement 4 is pushed onto the hub 1, the arms 10 and/or the barbs 12 provided therein are deformed outwards by the hub 1, the end of the hub being bevelled to assist this. When barbs 12 have become aligned with the V-shaped groove 13 formed in the hub 1, they are able to spring back into their normal positions, i.e. projecting radially inwards, and to engage with the groove 13. The arrangement 4 cannot then move in the opposite direction to that shown by arrow 16, i.e. off the hub 1, and the arrangement 4 is locked into position relative to the hub 1.

The hub 1 is provided with outwardly extending lugs or trunnions 18 to which the fins are mounted. Each lug 18 has a pivot pin 19 passing through it, the pin 19 also passing through the fin mounted to that lug 18, thereby securing the fin to the lug 18, but also allowing the fin to turn relative to the hub 1. When the spring arrangement is in position on hub 1, each arm 11 lies between the hub 1 and a respective one of the fins with the pivot 19 at about the centre of the arm.

Each fin is shaped so as to define a camming surface 21 in the region around the pivot pin 19, which surface is terminated by an abutment 22.

Referring now in particular to the upper portion of FIG. 1 which illustrates the fin 2 in its stowed position, i.e. before and during launch of the projectile, the fin 2 is held parallel to the hub axis, i.e. with its edge 23 against arm 11 causing the end portion 14 of the arm to be pushed flat against the hub 1. When the fins are released after launch, the spring force in each end portion 14 throws the respective fin outwards away from the hub 1, i.e. for fin 2, in the direction of arrow 24. The turning movement of the fin is stopped by edge 25 of the fin coming into contact with the spring arrangement. During the movement, the flap 15 remains held against the hub 1 by the camming surface 21 until the abutment 22 reaches the flap. At this point, the flap 15 is free to spring up and latch with the abutment 22, locking the fin into its deployed position.

The spring arrangement 4 is made from a blank 26 shown in FIG. 3. The blank 26 comprises a flat piece of spring steel cut or stamped to define the annular portion 5 with its central hole 6, with the six longer arms 11 and six shorter arms 10 extending radially outwards from the annular portion 5. The arms 10 and 11 are distributed around the whole circumference of the annular portion 5, with the shorter arms alternating with the longer ones. The arms 10 have tongues forming the barbs 12, while the arms 11 have longer tongues, these eventually forming the flaps 15.

The operation of the spring arrangement 4 described above, would not be affected by the direction in which the fins are folded in their stowed position, i.e. the arrangement can be used whether the fins are folded forwards or backwards along the projectile. The function of the rotatable hub 1 is to enable the fins to rotate around the body of the projectile. It will be appreciated that the spring arrangement 4 could be adapted for use on a projectile in which the fins are not so free to rotate.

In the illustrated case, the annular portion 5 of the spring arrangement 4 has an additional function as a shield which gives a degree of protection to the bearings for hub 1 against the effects of the high pressure projectile efflux. This protection may be further enhanced by a sealing washer 27 positioned, as shown in FIG. 1, between the fixed body part 7 and the annular portion 5 and the hub extension 8. In the described example, the arrangement 4 was made from a steel blank 26, however, any other spring material may be used, e.g. phosphor-bronze.

Naturally, the arrangement 4 can be modified to deploy more or less than six fins depending on the projectile in which the arrangement is to be used.

I claim:

1. In a projectile comprising a body portion, a plurality of fins spaced around the body portion and pivotably connected thereto for radially outward movement from respective stowed positions adjacent said body portion to respective deployed positions in which they extend radially from the body portion, and a fin deployment assembly including a body engaging part engaged with said body portion and a plurality of spring members, supported by the body engaging part and operable for engaging respective ones of said fins and urging movement thereof from the stowed to the deployed position, the improvement comprising said deployment assembly comprising a one-piece integral member made from a single piece of sheet spring material shaped to define a connecting portion, a plurality of first spring portions defining said body engaging part extending from said connecting portion and operable for gripping said body portion between them for maintaining the member attached to the body portion, and a plurality of second spring portions extending all in the same general direction from said connecting portions and operable for engaging respective ones of said fins and applying radially outward spring forces thereto.

2. A projectile according to claim 1, wherein said connecting portion is annular in shape, and said first spring portions and said second spring portions are elongate and extend from the outer edge of the connecting portion all in the same general direction.

3. A projectile according to claim 2, wherein each first spring portion is cut to define a tag which extends inwardly from the remainder of the first portion to engage a groove in said body portion.

4. A projectile according to claim 2, wherein each second spring portion is cut to define a tag which extends outwardly from the remainder of the second portion for engaging an abutment formed on the associated fin to maintain deployment of said fin.

* * * * *